United States Patent [19]

Noell et al.

[11] Patent Number: 5,486,407
[45] Date of Patent: Jan. 23, 1996

[54] HIGH RUBBER BACKING MULTI-LAYER ABS SYSTEM WHICH EXHIBITS IMPROVED CHEMICAL RESISTANCE TO HCFC BLOWING AGENTS

[75] Inventors: John L. W. Noell; Satish Gaggar, both of Parkersburg; George P. McCarty; Kenneth Miller, both of Vienna, all of W. Va.

[73] Assignee: General Electric Co., Pittsfield, Mass.

[21] Appl. No.: 73,869

[22] Filed: Jun. 8, 1993

[51] Int. Cl.⁶ .................................................. B32B 7/02
[52] U.S. Cl. ........................ 428/215; 428/515; 428/521; 428/522; 312/406.1; 156/244.11
[58] Field of Search .................................... 428/522, 521, 428/515, 215; 312/406.1; 156/244.11

[56] References Cited

U.S. PATENT DOCUMENTS

| | | | |
|---|---|---|---|
| 3,855,376 | 12/1974 | Ono et al. | 264/46.1 |
| 4,005,919 | 2/1977 | Hoge et al. | 156/244 |
| 4,048,274 | 9/1977 | Hoge et al. | 264/46.5 |
| 4,101,702 | 7/1978 | Churchill et al. | 428/213 |
| 5,104,936 | 4/1992 | Blumenstein et al. | 525/85 |
| 5,219,665 | 6/1993 | Chen et al. | 428/515 |
| 5,324,589 | 7/1994 | Willard | 428/476.3 |

FOREIGN PATENT DOCUMENTS

| | | |
|---|---|---|
| 185950 | 7/1986 | European Pat. Off. . |
| 277543 | 8/1988 | European Pat. Off. . |
| 0320702 | 6/1989 | European Pat. Off. . |
| 367089 | 5/1990 | European Pat. Off. . |
| 0431166A1 | 6/1991 | European Pat. Off. . |
| 0579588 | 1/1994 | European Pat. Off. . |
| 1704698 | 7/1971 | Germany . |
| 58-217181 | 12/1983 | Japan . |
| 61-071201 | 3/1986 | Japan . |
| 63-058209 | 3/1988 | Japan . |
| 63-150785 | 6/1988 | Japan . |
| 63-255177 | 10/1988 | Japan . |
| 63-255184 | 10/1988 | Japan . |
| 1-056408 | 3/1989 | Japan . |
| 02175745A | 7/1990 | Japan . |
| 2-191474 | 7/1990 | Japan . |
| 2-206116 | 8/1990 | Japan . |
| 2-209995 | 8/1990 | Japan . |
| 2-207390 | 8/1990 | Japan . |
| 2-279619 | 10/1990 | Japan . |
| 2-309870 | 11/1990 | Japan . |
| 2-297902 | 11/1990 | Japan . |
| 3-040539 | 2/1991 | Japan . |
| 3-046621 | 3/1991 | Japan . |
| 3-111516 | 5/1991 | Japan . |
| 2067579 | 7/1981 | United Kingdom . |

OTHER PUBLICATIONS

U.S. patent application Ser. No. 07/983,333 filed Nov. 30, 1992 by G. Fred Willard (pending).

*Primary Examiner*—Edith Buffalow

[57] ABSTRACT

Multilayer sheets of an acrylonitrile-butadiene-styrene resin layer and a relatively high rubber acrylonitrile-butadiene-styrene resin layer are provided which are thermoformable. The multilayer sheets exhibit resistance to halogenated blowing agents which escape from foamed-in-place insulation. The multilayer sheets can be thermoformed to provide equipment liners such as refrigerator liners, dishwasher liners, car interior panels, and appliance housings.

11 Claims, 1 Drawing Sheet

HIGH RUBBER BACKING MULTI-LAYER ABS SYSTEM WHICH EXHIBITS IMPROVED CHEMICAL RESISTANCE TO HCFC BLOWING AGENTS

BACKGROUND OF THE INVENTION

The present invention relates to thermoformable, multi-layer acrylonitrile-butadiene-styrene (ABS) resin sheets, equipment liners, and insulative equipment systems. More particularly, the present invention relates to thermoformable, multilayer ABS sheets and thermoformed equipment liners obtained therefrom which are used with foamed-in-place insulation in insulative equipment systems.

Acrylonitrile-butadiene-styrene resins comprise three building blocks, acrylonitrile, butadiene, and styrene which allow for variation in properties such as chemical resistance, heat stability, impact resistance, and toughness, rigidity, and processing ease, depending on the percentages of the three major components therein and the additives used. In addition to providing useful properties to the finished products, ABS resins can be easily processed to finished parts such as by coextrusion, sheet extrusion, thermoforming, blow molding, profile extrusion, and injection molding. Because of its versatility, ABS is used in a wide variety of applications, such as equipment liners, in that it provides strong, durable shielding in many environments. Typical equipment liners include automotive interior trim, business machine housings, refrigerator liners, freezer liners, dishwasher liners, cooling chest liners and appliance housing liners. ABS resin is often the material of choice for its balance of strength, toughness (impact resistance), appearance (gloss and color), chemical resistance, processability, and price. For example, this balance of properties makes ABS extruded sheets the material of choice for thermoformed equipment liners such as the interior food compartments and door liners of refrigerators. Other major end uses of ABS thermoformed extruded sheet include dishwasher liners and interior and exterior parts for trucks, autos, boats, and mobile homes.

ABS provides deep draw capability for thermoforming operations, strength and toughness for durability in assembly and use, high gloss, stain and chemical resistance to items such as food. Sheet extrusion grades of-ABS are produced as low, medium, or high impact resins with various gloss levels ranging from high gloss to matte (low gloss). In many end uses, such as refrigerator liners, the ABS is exposed to foamed-in-place insulation during assembly. Foamed-in-place insulation typically generates a rush of blowing agent so as to foam the insulative material (polyurethane). This rush of blowing agent comes in contact with and permeates into conventional ABS liners, causing embrittlement and surface cracks. It is believed that the blowing agents utilized for the foamed-in-place insulation, particularly fluorohydrocarbons, more particularly hydrochlorofluorocarbons, degrade the ABS liner when they come in contact with the liner, causing it to crack, despite the chemical resistance and impact resistance of ABS resin. Methods for improving the resistance of ABS resin to these blowing agents, such as the utilization of a high level of acrylonitrile, often result in the loss of some advantages of ABS resin. Use of multilayered liners employing an ABS substrate layer and a layer of barrier material located between the ABS layer and the polyurethane foam can effectively protect the ABS layer, but can also result in difficulties when recycling the liners (and trim therefrom) as a blend material due to incompatibility between the barrier layer material and the ABS substrate layer material thereby making the liner economically and environmentally unattractive.

Accordingly, it is desirable to provide a multilayer equipment liner based on ABS resin which is more resistant to physical property degradation caused by foamed-in-place insulation as evidenced by maintenance of the ductile break impact properties of the liners and which is easily recycled by regrinding to yield a compatible blend composition.

It is therefore, an object of the present invention to provide thermoformable sheets based on acrylonitrile-butadiene-styrene resin which are resistant to degradation from the blowing agents used in foam-in-place insulation as evidenced by maintenance of impact strength and ductile break properties.

It is an additional object of the present invention to provide an equipment liner resistant to property loss from exposure to halogenated hydrocarbons blowing agents used for foamed-in-place insulation and which can be easily reground into a compatible blend material which may serve as a useful molding material.

Upon further study of the specification and appended claims, further objects and advantages of this invention will become apparent to those skilled in the art.

These and other objects are achieved by a thermoformable multilayer sheet which comprises an outer layer of a first ABS resin, and a protective inner layer of second ABS resin. Thermoformed equipment liners obtained from this multilayer sheet are also provided, and insulative equipment systems are also provided involving the liners and the insulative foam.

SUMMARY OF THE INVENTION

Figure 1:
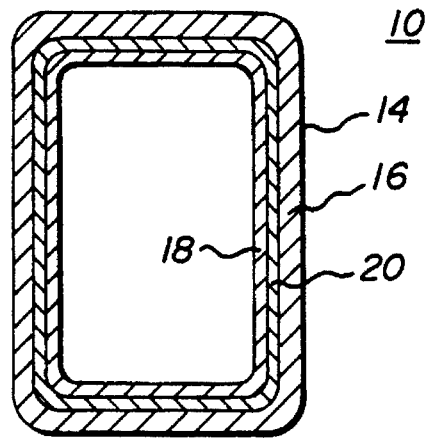
FIG. 1 illustrates a front cross sectional view of a insulative refrigerator equipment system.

It has been found that the desirable properties of the first ABS resin layers, such as finish, chemical resistance, and impact resistance, are not lost while the second ABS resin layer provides the liner with the ability to maintain its ductility upon prolonged exposure to the halogenated hydrocarbon blowing agents resulting from foamed in place insulation. These multilayer sheets are thermoformable and can be reground as compatible blends. It is often impractical to thermoform multilayered sheets into finished articles because the materials of the various layers when reground together typically yield incompatible blend compositions making use of trimmed excess and recycling difficult. In other words, the materials of the different layers are often incompatible and separate upon subsequent processing or in use. It has been found that the present multilayer sheets can be reground as a compatible blend.

DETAILED DESCRIPTION OF THE INVENTION

A significant advantage provided by the ABS resin liner utilized in this invention is that it is very easy to process by thermoforming, even in large volumes, maintains its ductility even upon extended exposure to halogenated hydrocarbon blowing agents, more specifically hydrochloroflourocarbon blowing agents, and can be easily reground into a compatible blend which is useful as an extrusion composition. Many ABS resin grades provide deep draw capability in thermoforming operations. Furthermore, ABS resins are tough and durable once formed into a desired shape; so they are easily machined, bonded, fastened, decorated, or finished by techniques common in use. General purpose ABS grades which are commercially available for extrusion are particularly suitable for use as the first ABS resin layer in the multilayer sheets of the present invention. It is preferred that the first ABS resin layer have a high gloss.

Acrylonitrile-butadiene-styrene resins (generically referred to herein as a vinyl aromatic-unsaturated nitrile-diene rubber graft copolymers) suitable for use in the first ABS resin layer of this invention comprise three building blocks, unsaturated nitrile monomer, diene rubber, and vinyl aromatic monomer, (for example, acrylonitrile, polybutadiene rubber, and styrene), which can vary widely with respect to the percentage used. The proportion of these components can be tailored to desired needs such as chemical resistance, heat stability, impact resistance, toughness, rigidity, and processing needs. The relative proportion of these components will vary with respect to the desired end use. The first ABS resin is not a random terpolymer of unsaturated nitrile, butadiene, and vinyl aromatic monomers but preferably is a vinyl aromatic-unsaturated nitrile grafting copolymer grafted to rubbery butadiene polymer substrate in admixture with a non-grafted vinyl aromatic-unsaturated nitrile. The first ABS resin comprises both non-grafted vinyl aromatic-unsaturated nitrile rigid copolymer and vinyl aromatic-unsaturated nitrile-polybutadiene graft copolymer. The butadiene provides a rubbery polymer substrate which exists as discrete particles. The rubbery polymer substrate can exist in sizes of from 0.1 m to several microns (i.e. 10 microns) in diameter. The total rubber content of the first ABS resin ranges from 5–30 percent by weight based on the total weight of the first ABS resin. The vinyl aromatic-unsaturated nitrile rigid and grafting copolymers usually contain from about 20–40 weight percent vinyl aromatic based on the total weight of vinyl aromatic and unsaturated nitrile therein. The vinyl aromatic is preferably styrene but the styrene can be wholly or partially replaced by other vinyl aromatic monomers such as substituted styrene such as halostyrenes and methylstyrene. The unsaturated nitrile is preferably acrylonitrile but the acrylonitrile may be wholly or partially replaced by other unsaturated nitrile monomers such as methacrylonitrile. The diene rubber can be a homopolymer of butadiene or may be copolymer of butadiene-ethylenically unsaturated monomer such as a butadiene-styrene copolymer and butadiene-acrylonitrile copolymer.

The first ABS resin is broadly defined as a rubber graft copolymer composition which comprises from 5 to 30 weight percent of a rubbery polymer substrate and from 70 to 95 weight percent of a vinyl aromatic-unsaturated nitrile copolymer in the form of non-grafted and grafting copolymer based on the entire weight of the first ABS resin. Preferably, the first ABS resin comprises from 10 to 25 weight percent rubbery polymer substrate (more preferably from 17.5 to 20 weight percent thereof) and from 75 to 90 weight percent vinyl aromatic-unsaturated nitrile copolymer (most preferably from 80 to 82.5 weight percent thereof). Suitable rubbery substrate polymers include polymers and copolymers of conjugated dienes. Preferably, the rubbery polymer substrate comprises polybutadiene or a polybutadiene-styrene copolymer or polybutadiene-acrylonitrile copolymer. The rubbery substrate may contain or be free of other comonomers such as acrylates (alkyl acrylates and alkyl methacrylates) and monoolefins.

The first ABS resin is formed by reacting in the presence of the rubbery polymer substrate two or more monomers from the following groups: (I) vinyl aromatic monomers selected from unsubstituted vinyl aromatic monomers, halogen-substituted vinyl aromatic monomers, alkyl-substituted vinyl aromatic monomers, and (II) unsaturated nitrile monomers selected from unsubstituted acrylonitrile and substituted acrylonitriles. The ABS resin may be made with or be free of the following comonomers: ethylenically unsaturated carboxylic acids, diacids, dianhydrides, acid esters, diacid esters, amides, imides and N-substituted imides, acrylates and alkylacrylates. It is preferred that the (grafting and non-grafted) copolymers are formed from 60 to 75 weight percent of at least one vinyl aromatic monomer selected from the group consisting of styrene, α-methylstyrene, and halogen-substituted styrene, and from 25 to 40 weight percent (preferably from 25–35 weight percent) of at least one different monomer selected from unsaturated nitrile monomers such as acrylonitrile, based upon the total weight of the (grafting and non-grafted) vinyl aromatic-unsaturated nitrile copolymer. Optionally the (grafting and non-grafted) vinyl aromatic-unsaturated nitrile copolymer may contain or be free of comonomers such as methyl methacrylate, maleic anhydride, maleimide, N-phenyl maleimide and acrylamide based on the total weight of the copolymer. Optionally, the (grafting and non-grafted) vinyl aromatic-unsaturated nitrile copolymers are formed from 60 to 80 weight percent of at least one vinyl aromatic monomer and from 20 to 40 weight percent of at least one unsaturated nitrile (vinyl cyanide) monomer, based upon the total weight of the vinyl aromatic-unsaturated nitrile copolymers.

Additionally, it is preferred that the (grafting and non-grafted) vinyl aromatic-unsaturated nitrile copolymers of the first ABS resin are formed from at least one monomer selected from the group consisting of styrene, α-methylstyrene and dibromostyrene, and from acrylonitrile. Preferred vinyl aromatic-unsaturated nitrile copolymers include, but are not limited to, the following: styrene-acrylonitrile; styrene-acrylonitrile-maleic anhydride; styrene-α-methylstyrene-acrylonitrile; styrene-α-methylstyrene-acrylonitrile-N-phenyl maleimide; styrene-acrylonitrile-N-phenyl maleimide; styrene- acrylonitrile-N-phenyl maleimide-maleic anhydride; styrene-methyl methacrylate-acrylonitrile; styrene-methyl methacrylate-acrylonitrile-maleic anhydride; styrene-methyl methacrylate-α-methylstyrene-acrylonitrile; styrene-methyl methacrylate-α-methylstyrene-acrylonitrile-N-phenyl maleimide; styrene-methyl methacrylate-acrylonitrile-N-phenyl maleimide;styrene-methylmethacrylate-acrylonitrile-N-phenyl maleimide-maleic anhydride; styrene-dibromostyrene-acrylonitrile; styrene-dibromostyrene-acrylonitrile; styrene-dibromostyrene-acrylonitrile-maleic anhydride; styrene-dibromostyrene-α-methylstyrene-acrylonitrile; and styrene-dibromostyrene-acrylonitrile-N-phenyl maleimide. Preferably the styrene-acrylonitrile copolymers are styrene acrylonitrile copolymers which are free of other comonomers.

The first ABS resin component may be prepared according to any of the methods well known in the art including emulsion, bulk, mass or suspension processes or a combination of these processes. Preferably the first ABS resin is made by emulsion polymerization in order to have a high gloss appearance.

The second ABS resin layer is made from a second ABS resin. The second ABS resin is broadly defined as a high rubber graft copolymer composition which comprises from 35 to 70 weight percent of a polymeric diene rubber substrate and from 30 to 65 weight percent of a polymeric vinyl aromatic-unsaturated nitrile copolymer in the form of non-grafted and grafting copolymer, based on the entire weight of the second ABS resin. Preferably, the second ABS resin comprises from 35 to 50 weight percent polymeric diene rubber substrate and from 50 to 65 weight percent vinyl aromatic-unsaturated nitrile copolymer. Suitable polymeric rubber substrate polymers are polymers and copolymers of conjugated dienes comprising at least 50 percent by weight butadiene based on the entire weight of the polymeric rubber substrate. Preferably, the polymeric rubber substrate is selected from the group consisting of polybutadiene, a polybutadiene-styrene, polybutadiene-acrylonitrile copolymer. Surprisingly the high level of butadiene rubber in the second ABS resin allows for maintaining ductility of the liner upon exposure to the halogenated hydrocarbon blowing agents. The rubbery substrate may contain or be free of other comonomers or other rubbery materials such as acrylates (alkyl acrylates and alkyl methacrylates) and monoolefins.

The second ABS resin is formed by reacting in the presence of the rubbery substrate two or more monomers from the following groups: (1) vinyl aromatic monomers including unsubstituted vinyl aromatic monomers, halogen-substituted vinyl aromatic monomers, alkyl-substituted vinyl aromatic monomers, and (2) unsaturated nitrile monomers including acrylonitrile, and substituted acrylonitriles, and optionally (3) comonomers such as ethylenically unsaturated carboxylic acids, diacids, dianhydrides, acid esters, diacid esters, amides, imides and N-substituted imides, acrylates and alkylacrylates. It is preferred that the vinyl aromatic-unsaturated nitrile copolymers of the second ABS resin are formed from 60 to 75 weight percent of at least one vinyl aromatic monomer selected from the group consisting of styrene, α-methylstyrene, and halogen-substituted styrene, and from 25 to 40 weight percent of at least one unsaturated nitrile monomer, preferably acrylonitrile based on the total weight of the vinyl aromatic-unsaturated nitrile copolymers of the second ABS resin. Optionally, the vinyl aromatic-unsaturated nitrile polymers are formed from 60 to 80 weight percent of at least one vinyl aromatic monomer and from 20 to 40 weight percent of at least one unsaturated nitrile monomer based on the total weight of vinyl aromatic-unsaturated nitrile copolymer.

Additionally, it is preferred that the vinyl aromatic-unsaturated nitrile polymers of the second ABS resin are formed from at least one monomer selected from the group consisting of styrene, α-methylstyrene and dibromostyrene, and from acrylonitrile. Preferred non-grafted and grafting vinyl aromatic-unsaturated nitrile copolymers of the second ABS resin include, but are not limited to, the following: styrene-acrylonitrile; styrene-acrylonitrile-maleic anhydride; styrene-α-methylstyrene-acrylonitrile; styrene-α-methylstyrene-acrylonitrile-N-phenyl maleimide; styrene-acrylonitrile-N-phenyl maleimide; styrene-acrylonitrile-N-phenyl maleimide-maleic anhydride; styrene-methyl methacrylate-acrylonitrile; styrene-methyl methacrylate-acrylonitrile-maleic anhydride; styrene-methyl methacrylate-α-methylstyrene-acrylonitrile; styrene-methyl methacrylate-α-methylstyrene-acrylonitrile-N-phenyl maleimide; styrene-methyl methacrylate-acrylonitrile-N-phenyl maleimide; styrene-methyl methacrylate-acrylonitrile-N-phenyl maleimide-maleic anhydride; styrene-dibromostyrene-acrylonitrile; styrene-dibromostyrene-acrylonitrile; styrene-dibromostyrene-acrylonitrile-maleic anhydride; styrene-dibromostyrene-α-methylstyrene-acrylonitrile; and styrene-dibromostyrene-acrylonitrile-N-phenyl maleimide. Preferably the vinyl aromatic-unsaturated nitrile copolymers of the second ABS resin copolymer are styrene-acrylonitrile copolymers free of other comonomers.

The second ABS resin may be prepared according to any of the methods well known in the art including emulsion processes.

The graft polymer compositions used for the first and second ABS resin can contain conventional additives such as plasticizers and/or lubricants which are conventionally used to alter the properties. Other conventional comonomers may be copolymerized in the ABS resin polymer, as well. Optionally, the ABS resins are free of such comonomers such as acrylates, specifically methyl methacrylate. Preferably the multilayer sheet is free of additional layers such as adhesive layers or barrier layers such as polyolefins layers or polyamide layers all of which could adversely affect the compatibility of regrind obtained therefrom.

In an emulsion process, a diene rubber latex is prepared, generally in emulsion reactions, either as a homopolymer or as a copolymer having up to 35% styrene or acrylonitrile: In the next step, styrene and acrylonitrile are reacted in the presence of the diene rubber using free radical initiators such as potassium persulfate and chain transfer agents. Concurrently graft copolymer and non-grafted copolymer is formed. Emulsion ABS resins may then be recovered from latex by coagulation with salt or acid solutions.

In contrast to the emulsion process, the suspension process begins with a noncrosslinked or lightly crosslinked diene rubber which is soluble in monomers. A prepolymer is made following dissolution of styrene in the rubber and introduction of acrylonitrile to obtain 20–30 percent conversion after reaction at 80°–120° C. for 6–8 hours. The polymer syrup is dispersed in water in a suspension reactor, chain transfer agents are added, and the reactor is heated to 100°–170° C. In bulk polymerization, a polymer syrup is obtained in a manner similar to suspension polymerization (30 percent conversion). The syrup is then pumped into a suitable reactor where conversion is taken to 50–80 percent.

Examples of suitable, commercially available ABS resins are those provided by General Electric Company under the trade designation CYCOLAC® resin, particularly the general purpose grades, the extrusion grades, and blow molding grades.

The layers which form the sheets and equipment liners of the present invention can be made by coextrusion utilizing conventional equipment. An alternative is to extrude a separate film of the second ABS resin then adhere the film to a sheet of the first ABS resin with an adhesive layer or by direct melt bonding by conventional lamination techniques known to those skilled in the art to form the desired sheet.

The multilayer sheets and equipment liners of the present invention can vary widely in thickness and in proportion of the first ABS resin layer and the second ABS resin layer. The liner resulting from thermoforming of the sheet will result in a liner thickness that is typically 20% to 90% of the thickness of the original sheet due to stretching of the sheet during drawdown thereof.

The minimum thickness of the sheet and liner is determined by the strength, stiffness, rigidity, and integrity necessary in the finished article. Generally, the minimum thickness of the liner is about 10 mils and preferably about 20 mils. The maximum combined thickness of the layers forming the equipment liners is not critical but is governed by such secondary considerations as appearance, cost, weight, and the like. One illustration of the liners formed according to the present invention may have a combined wall thickness of from 10 to 200 mils, more preferably from 20 to 150 mils, and more preferably from 20 to 125 mils, for example, from 20 to 70 mils.

The minimum thickness of the second ABS resin layer in the liner is such that the layer functions to maintain the ductility of the liner upon prolonged exposure to the halogenated hydrocarbon blowing agents used in foamed-in-place insulation. This thickness in the liner depends to a certain degree upon the particular loading of rubber utilized in the second ABS resin. Generally, however, this minimum thickness of the second ABS resin layer in the liner is 5 mils and is preferably 10 mils to allow for easy processing. The upper thickness range for the second ABS resin layer in the liner is not critical but is controlled by such secondary considerations as cost, appearance, fabrication, and product weight. As a non-limiting illustration, equipment liners of the present invention typically have a second ABS resin layer thickness of from 5 to 100 mils and more typically 10 to 75 mils, and even more preferably from 12 to 25 mils. In general, the first ABS resin layer in the liner ranges in thickness from 5 to 100 mils, and preferably from 10 to 50 mils, and is typically from 12–25 mils.

The multilayer sheet preferably has a total thickness which is greater than 10 mil, preferably greater than 20 mil, preferably from 50 mil to 250 mil, more preferably from 75 mil to 200 mil, and most preferably from 100 to 150 mil. The second ABS resin layer of the sheet preferably has a thickness which is from 10 percent to 60 percent by thickness of the total thickness of the sheet, preferably having a thickness of from 10 mil to 125 mil, more preferably from 20 mil to 100 mil, and most preferably from 30 mil to 75 mil. The first ABS resin layer of the sheet preferably has a thickness of from 10 to 200 mil, more preferably from 50 to 150 mil, and most preferably from 50 to 120 mil. The sheet may contain additional layers such as a regrind layer comprising the first ABS resin and the second ABS resin, and may contain additional layers such as adhesive layers, or maybe free of any of the above layers. Optionally an additional layer may be present on the appearance side of the liner to provide the liner with the desired subject appearance. Preferably, if a regrind layer is utilized in the sheet, it is located between the first ABS resin layer and the second ABS resin layer. Preferably the second ABS resin layer of the liner has a thickness of from 10 to 60 percent of the total thickness of the liner.

The adhesive layer, which is optional in the sheet and liner, can be of minimal thickness, i.e., a thickness of 0.5 mils is adequate. The upper thickness of this range is not critical but is typically controlled by available regrind, ease of fabrication, cost, and other secondary considerations. As a non-limiting illustration, the multilayer sheets and equipment liners of the present invention typically may incorporate an adhesive layer of from 0.5 to 20 mils, more typically from 0.5 to 2 mils. Preferably the sheet and liner are free of adhesive layers.

The multilayer liner of the present invention has superior retention of ductility over monolayers of low and moderate level rubber ABS resin liners of equivalent thickness. Insulative equipment systems comprise a liner according to the present invention, an outer wall, and an insulative foam disposed between and in contact with the liner and the wall, wherein the foam has been foamed in place between the liner and the wall by using a halogenated hydrocarbon blowing agent.

The insulative equipment system of the present invention employs a liner as set out above, a wall spaced apart from the liner, and a foamed-in-place insulative foam located between the liner and the wall, and preferably in contact therewith. The insulative equipment system is manufactured by foaming in place the insulative material utilizing a halogenated hydrocarbon blowing agent to form a insulative foamed material between the liner and the wall. The liner and the wall may have a spacing of from ½ inch to 4 inches with a corresponding foam thickness located therebetween of from ½ inch to 4 inches, preferably from 1 inch to 3 inches. The wall may be, for example, a metal wall such as steel or aluminum or may be a thermoplastic or a thermoset wall. Suitable insulative equipment systems include the housings for refrigerators, freezers, dishwashers and door panels.

The blowing agents which are utilized in foamed-in-place insulation are volatile liquids or gases which can be absorbed into the polymer composition and will vaporize at temperatures below the glass transition temperature of the resin matrix. Blowing agents of foamed-in-place insulation may include conventional hydrocarbon or fluorocarbon blowing agents. Conventional fluorocarbon blowing agents include trichlorofluoromethane (Freon® 11), dichlorodifluoromethane (Freon® 12), and difluorochloromethane (Flormacell® S and Freon® 14). Other halogenated hydrocarbon blowing agents include, but not limited to, methylene chloride, chloroform, carbon tetrachloride, and HCFC's, such as dichlorotrifluoroethane (HCFC-123), chlorotetrafluoroethane (HCFC-124), tetrafluoroethane (HFC-134A), dichlorofluoroethane (HCFC-141B), chlorodifluoroethane (HCFC-142B), and difluoroethane (HFC-152A). The matrix of the foamed-in-place insulation can be any thermoplastic with a low glass transition temperature that combines with a blowing agent and is typically polyurethane.

The solution of the present invention is especially advantageous in overcoming the problem of embrittlement of conventional low and moderate rubber level ABS resin monolayers upon exposure to HCFC blowing agents in foamed-in-place polyurethane foam manufacturing processes. Additionally, use of the multilayer system overcomes deficiencies present in use of monolayer liners of either low rubber material moderate rubber material or the high rubber material. A monolayer liner of the low or moderate rubber level material would exhibit stress cracking upon exposure to the HCFC, and a monolayer liner of the high rubber level material would most likely exhibit a undesirably low gloss and high plasticization resulting in loss of modulus upon exposure to the HCFC blowing agents.

The multilayer sheets of the present invention can be thermoformed utilizing conventional equipment. There are numerous types of equipment which provide for thermoforming by various techniques such as vacuum forming, mechanical drawing, and the like. The multilayer sheets of this invention can be thermoformed to provide equipment liners such as refrigerator liners, dishwasher liners, and panels for automotive interiors or any liner for an insulative box using foamed-in-place insulation.

Figure 2:
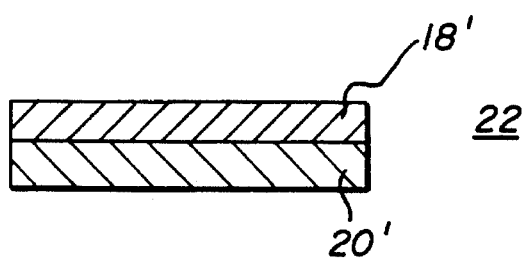
FIG. 2 illustrates a cross sectional view of a multilayer sheet.
Figure 3:
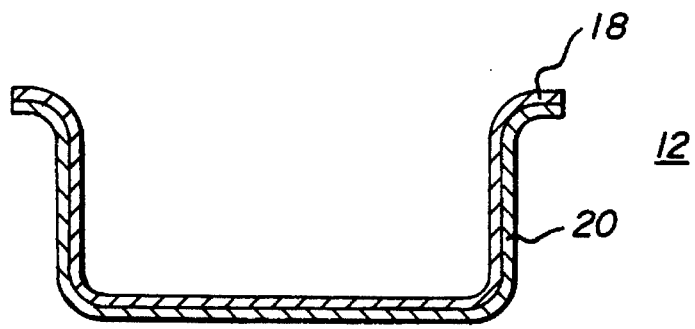
FIG. 3 illustrates a cross sectional view of a liner.

The present invention may be illustrated by FIGS. 1, 2, 3 and 4. FIG. 1 illustrates a cross sectional view of an insulative refrigerator equipment system (10) comprising an inner liner (12) an outer wall (14) and an insulative foam material (16) disposed therebetween. The liner (12), is illustrated in FIGS. 1 and 3 has an inner, first ABS resin layer (18) and an outer, protective second ABS resin layer (20) which is meant to protect the inner layer (18) from the blowing agents generated by in place foaming of the rigid insulative foam layer (16). The liner (12) is made by thermoforming a multilayer sheet (22). The multilayer sheet

Figure 4:
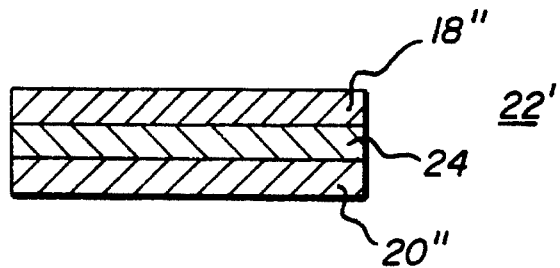
FIG. 4 illustrates a cross sectional view of a multilayer sheet having an internal regrind layer.

(22) which is shown in FIG. 2 has a first ABS resin layer (18'), and a second ABS resin layer (20') which upon thermoforming correspond to the liner layers (18) and (20) respectively. Thermoforming, however, results in the layers (18) and (20) being somewhat thinner than the original sheet layers (18') and (20'). Excess trim from the thermoforming operation can be reground as a compatible blend and reintroduced as a regrind layer (24) as illustrated in FIG. 4, and is preferably located between a first ABS resin layer (18") and the second ABS resin layer (20") to thereby create a three layered multilayer sheet (22').

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

The entire disclosure of all applications, patents, and publications, cited herein, are hereby incorporated by reference.

EXAMPLES

TEST:

1. Compression molded bilayer samples (125 mils) using extruded sample components
2. Exposed 1.5" wide strips to HCFC 123 in a 3 point bend jig strained at 2%. The strips are mounted such that the first ABS resin is in compression and the second ABS resin is in tension.
3. Visual observation of surface cracks and puncture impact after exposure to evaluate embrittlement of the samples.

TABLE 1

| Exposure Time | A | 1 | B |
|---|---|---|---|
| 1 hr | Brittle | Ductile | Brittle |
| 2 hr | | Ductile | |
| 4 hr | | Ductile | |

| Exposure Time | 2 | C | 3 |
|---|---|---|---|
| 1 hr | Ductile | Brittle | Ductile |
| 2 hr | Ductile | | Ductile |
| 4 hr | Ductile | | Ductile |

Examples A, B and C were monolayer sheets at 125 mils thick. Examples 1, 2 and 3 were bilayer sheets having a total thickness of 125 mils which had a second ABS resin layer thickness of 25 mils (also tested ductile at 12 mils) protecting a first ABS resin layer to yield a ductile sheet. The second ABS resin of examples 1, 2 and 3 was an ABS resin having by weight polybutadiene and having a styrene to acrylonitrile ratio of 65/35. The first ABS resin of example A was an ABS resin having 17.5% polybutadiene and having a 72/28 styrene to acrylonitrile weight ratio. The first ABS resin of example B is an ABS having 20% polybutadiene rubber and having a 65:35 weight styrene to acrylonitrile weight ratio. The first ABS resin of example C is an ABS having 22.5 percent by weight polybutadiene rubber and having a styrene to acrylonitrile ratio of 55:45.

We claim:

1. A thermoformable, coextruded, multilayer sheet comprising a first chemically resistant ABS resin layer of a first ABS resin comprising a rubbery polymer substrate having grafted thereon a vinyl aromatic-unsaturated nitrile grafting copolymer, said vinyl aromatic-unsaturated nitrile grafting copolymer being present in said first layer in an amount from 75 to 90 weight percent based on the total weight of the first ABS resin, said first ABS resin having a diene rubber content of from 10 to 25 percent by weight based on the total weight of the first ABS resin, a second ductile ABS resin layer of a second ABS resin comprising a polymeric diene rubber substrate and having grafted thereon a vinyl aromatic-unsaturated nitrile grafting copolymer, said vinyl aromatic-unsaturated nitrile grafting copolymer being present in said second layer in an amount from 50 to 65 weight percent based on the total weight of the second ABS resin, said polymeric diene rubber substrate being present at a level of from 35 to 70 percent by weight based on the total weight of the second ABS resin said vinyl aromatic-unsaturated nitrile grafting copolymer being present in said first and said second layer comprises from 25 to 40 weight percent of one unsaturated nitrile monomer and from 60 to 75 weight percent of at least one vinyl aromatic monomer selected from the group consisting of styrene, α-methylstyrene, and halogen-substituted styrene.

2. A thermoformable, multilayer sheet as in claim 1, having a thickness of between 50 mil and 250 mil.

3. A thermoformable, multilayer sheet as in claim 1, resistant to embrittlement caused by exposure to blowing agents from foamed-in-place insulation.

4. A thermoformable, multilayer sheet as in claim 3, which is thermoformed into a three-dimensional shape without separation of said layers.

5. A thermoformable, multilayer sheet as in claim 1, wherein the first ABS resin layer has a thickness of from 10 to 200 mil, said second ABS resin layer having a thickness of from 10 mil to 125 mil.

6. A thermoformable, multilayer sheet as in claim 1, wherein the sheet consists essentially of said second ABS resin layer and said first ABS resin layer.

7. A thermoformable, multilayer sheet as in claim 1, wherein the layers are coextruded.

8. A thermoformable, multilayer sheet as in claim 1, wherein the first ABS resin is a reaction product of acrylonitrile, styrene and 1,3 butadiene rubber.

9. A thermoformable, multilayer sheet as in claim 1, consisting of said second ABS resin layer and said first ABS resin layer.

10. A thermoformable, multilayer sheet as in claim 1, wherein said second ABS resin layer has a thickness of from 10 to 60 percent of the total thickness of said sheet.

11. A sheet as in claim 1 wherein said sheet further comprises a regrind layer located between said first ABS resin layer and said second ABS resin layer, said required layer comprising a blend of said first ABS resin and said second ABS resin.

* * * * *